US010491840B2

(12) United States Patent
Okazawa (10) Patent No.: US 10,491,840 B2
(45) Date of Patent: Nov. 26, 2019

(54) IMAGE PICKUP APPARATUS, SIGNAL PROCESSING METHOD, AND SIGNAL PROCESSING PROGRAM

(71) Applicant: OLYMPUS CORPORATION, Hachioji-shi, Tokyo (JP)

(72) Inventor: Atsuro Okazawa, Hino (JP)

(73) Assignee: OLYMPUS CORPORATION, Tokyo (JP)

(*) Notice: Subject to any disclaimer, the term of this patent is extended or adjusted under 35 U.S.C. 154(b) by 135 days.

(21) Appl. No.: 15/825,969

(22) Filed: Nov. 29, 2017

(65) Prior Publication Data

US 2018/0084209 A1    Mar. 22, 2018

Related U.S. Application Data

(63) Continuation of application No. PCT/JP2015/086524, filed on Dec. 28, 2015.

(30) Foreign Application Priority Data

Jul. 13, 2015 (JP) ................................ 2015-139929

(51) Int. Cl.
*H04N 5/357* (2011.01)
*G03B 13/36* (2006.01)
(Continued)

(52) U.S. Cl.
CPC .......... *H04N 5/3572* (2013.01); *G03B 13/36* (2013.01); *H04N 5/23209* (2013.01); *H04N 5/243* (2013.01); *H04N 5/3696* (2013.01)

(58) Field of Classification Search
CPC ............... H04N 5/3572; H04N 5/3696; H04N 5/23212; H04N 5/23209; H04N 5/217; H04N 5/243; G03B 13/36; G02B 7/34
See application file for complete search history.

(56) References Cited

U.S. PATENT DOCUMENTS

2006/0274170 A1* 12/2006 Azuma ............. H04N 5/23238
                                                                 348/246
2010/0013947 A1*  1/2010 Oikawa ................ G03B 13/36
                                                                 348/222.1
(Continued)

FOREIGN PATENT DOCUMENTS

JP    2010-026178 A    2/2010
JP    2011-049638 A    3/2010
(Continued)

OTHER PUBLICATIONS

International Search Report issued in corresponding International Patent Application No. PCT/JP2015/086524 dated Mar. 22, 2016, consisting of 4 pp. (English Translation Provided).

*Primary Examiner* — Nhan T Tran
(74) *Attorney, Agent, or Firm* — Volpe and Koenig, P.C.

(57) ABSTRACT

An image pickup apparatus of the present invention includes: an image pickup optical system configured to form a subject image; an image pickup device configured to photoelectrically convert the subject image formed by the image pickup optical system, wherein part of pixels in a region provided with image formation pixels arranged in a matrix are arranged as focus detection pixels; an optical influence estimation unit configured to use output signals from the image formation pixels, output signals from the focus detection pixels, and two-dimensional pixel position information of the focus detection pixels to estimate a level of influence of vignetting caused by the image optical system according to an image height; and an optical influence correction unit configured to execute image processing with different details that vary according to an estimation result of the optical influence estimation unit.

7 Claims, 5 Drawing Sheets

(51) Int. Cl.
    *H04N 5/243*     (2006.01)
    *H04N 5/232*     (2006.01)
    *H04N 5/369*     (2011.01)

(56) References Cited

U.S. PATENT DOCUMENTS

| | | | |
|---|---|---|---|
| 2012/0057043 A1* | 3/2012 | Yamamoto | G02B 7/285 348/222.1 |
| 2012/0300104 A1* | 11/2012 | Onuki | H04N 5/23212 348/302 |
| 2014/0028881 A1* | 1/2014 | Miyatani | H04N 5/3572 348/246 |
| 2015/0365639 A1* | 12/2015 | Ogawa | H04N 5/3675 348/272 |
| 2016/0018721 A1 | 1/2016 | Okazawa | |

FOREIGN PATENT DOCUMENTS

| | | |
|---|---|---|
| JP | 2014-026062 A | 2/2014 |
| JP | 2014-116724 A | 6/2014 |
| JP | 2014-174357 A | 9/2014 |
| JP | 2015-018084 A | 1/2015 |
| WO | 2015-005249 A1 | 1/2015 |

\* cited by examiner

IMAGE PICKUP APPARATUS, SIGNAL PROCESSING METHOD, AND SIGNAL PROCESSING PROGRAM

CROSS REFERENCE TO RELATED APPLICATION

This application is a continuation application of PCT/JP2015/086524 filed on Dec. 28, 2015 and claims benefit of Japanese Application No. 2015-139929 filed in Japan on Jul. 13, 2015, the entire contents of which are incorporated herein by this reference.

BACKGROUND OF THE INVENTION

1. Field of the Invention

The present invention relates to an image pickup apparatus including an image pickup device configured to execute an automatic focus detection process of an image pickup surface phase difference detection system, a signal processing method applied in the image pickup apparatus, and a signal processing program describing the signal processing method.

2. Description of the Related Art

Conventionally, an image pickup apparatus, such as a digital camera and a video camera, has been generally implemented and widely used, the image pickup apparatus being configured to use, for example, a photoelectric conversion element (hereinafter, referred to as image pickup device), such as a CCD (charged coupled device) image sensor or a CMOS (complementary metal oxide semiconductor) image sensor, to sequentially perform photoelectric conversion of an optical image formed by an image pickup optical system and configured to record an image signal acquired by the photoelectric conversion as image data in a predetermined form (such as digital image data indicating still image or movie) in a storage medium, the image pickup apparatus being provided with an image display apparatus, such as a liquid crystal display (LCD) device and an organic electro-luminescence (OEL) display device, configured to display the still image or the movie based on the digital image data.

Some of the image pickup apparatuses of this type include an automatic focus adjustment mechanism for automatically adjusting, to an appropriate state, a focus state of the optical image of an object to be imaged formed by the image pickup optical system on an image pickup surface (light receiving surface) of the image pickup device when the image pickup apparatus performs an image pickup operation. In the image pickup apparatuses of recent years, various image pickup apparatuses are proposed and implemented, the image pickup apparatuses including, for example, an image pickup device configured to execute an automatic focus adjustment (AF, auto focus) process of an image pickup surface phase difference detection system by using some pixels of the image pickup device as focus detection pixels to perform focus detection of the phase difference detection system on the image pickup surface of the image pickup device.

Generally, in the image pickup apparatus including the image pickup device configured to execute the automatic focus adjustment process of the image pickup surface phase difference detection system, parts of openings of pixels for focus detection (hereinafter, referred to as focus detection pixels) among the plurality of pixels arranged on the image pickup surface are physically shielded from light. Therefore, an amount of light that can be acquired by the focus detection pixels is smaller than an amount of light that can be acquired by pixels used for image formation, that is, pixels (hereinafter, referred to as normal pixels) other than the focus detection pixels. Accordingly, various schemes of using a so-called gain correction process or the like to correct the amount of light acquired by the focus detection pixels by applying a process of gain-up or the like when the focus detection pixels are used as image forming pixels are proposed in Japanese Patent Application Laid-Open Publication No. 2014-116724 and the like.

In the image pickup apparatus disclosed in Japanese Patent Application Laid-Open Publication No. 2014-116724 and the like, the amount of gain to be applied in executing the gain correction process varies according to the incident angle of light with respect to the focus detection pixels with the same openings. Therefore, the amount of gain to be applied to a focus detection pixel positioned in a screen center region with a small incident angle and the amount of gain to be applied to a focus detection pixel positioned in a screen peripheral region with a large incident angle are different.

Accordingly, in the image pickup apparatus disclosed in Japanese Patent Application Laid-Open Publication No. 2014-116724 and the like, ratios of the focus detection pixels and the normal pixels near the focus detection pixels are sequentially calculated in a horizontal direction, and the amount of gain that varies according to the horizontal pixel position is obtained based on the ratio calculation results, for example. A scheme is disclosed, wherein the ratio computation results of respective horizontal positions are set as statistical data, an approximation formula indicating the change in the amount of gain from the screen center to the screen peripheral section is calculated from the statistical data, and the gain correction process is executed based on the formula (approximation formula).

In a conventional image pickup apparatus disclosed for example in Japanese Patent Application Laid-Open Publication No. 2014-174357, various types of information regarding an image pickup optical system (hereinafter, abbreviated as optical information and the like) are recorded in advance on a lens barrel side including the image pickup optical system, and a camera body side acquires the optical information and the like from the installed lens barrel to execute a gain correction process suitable for the installed lens barrel. In this case, various types of information including the optical information and the like are transmitted between the camera body and the lens barrel through electrical contacts provided on the camera body and the lens barrel.

SUMMARY OF THE INVENTION

An aspect of the present invention provides an image pickup apparatus including: an image pickup optical system configured to form a subject image; an image pickup device configured to photoelectrically convert the subject image formed by the image pickup optical system, wherein part of pixels in a region provided with image formation pixels arranged in a matrix are arranged as focus detection pixels; an optical influence estimation unit configured to use output signals from the image formation pixels, output signals from the focus detection pixels, and two-dimensional pixel position information of the focus detection pixels to estimate a level of influence of vignetting caused by the image optical system according to an image height; and an optical influence correction unit configured to execute image processing with different details that vary according to an estimation result of the optical influence estimation unit.

An aspect of the present invention provides a signal processing method of processing an output signal from an image pickup device configured to photoelectrically convert a subject image formed by an image pickup optical system, wherein part of pixels in a region provided with image formation pixels arranged in a matrix are arranged as focus detection pixels in the image pickup device, the signal processing method including: an optical influence estimation process of using output signals from the image formation pixels, output signals from the focus detection pixels, and two-dimensional pixel position information of the focus detection pixels to estimate a degree of influence of vignetting caused by the image optical system according to an image height; and an optical influence correction process of executing image processing with different details that vary according to the degree of influence of vignetting estimated in the optical influence estimation process.

As aspect of the present invention provides a non-transitory computer-readable medium storing a signal processing program for a computer of an image pickup apparatus, the signal processing program including: an optical influence estimation step of estimating a degree of influence of vignetting caused by an image optical system according to an image height by using output signals from image formation pixels, output signals from focus detection pixels, and two-dimensional pixel position information of the focus detection pixels; and an optical influence correction step of executing image processing with different details that vary according to the degree of influence of vignetting estimated in the estimating.

The benefits of the invention will become more apparent from the following detailed description.

DETAILED DESCRIPTION OF THE PREFERRED EMBODIMENT(S)

Hereinafter, the present invention will be described with reference to an illustrated embodiment. Each drawing used in the following description is schematically illustrated, and a dimensional relationship, a scale, and the like of each member may vary in each constituent element in order to illustrate each constituent element in a size that allows recognizing the constituent element on the drawing. Therefore, quantities of the constituent elements described in each drawing, shapes of the constituent elements, ratios of sizes of the constituent elements, relative positional relationships between respective constituent elements, and the like of the present invention are not limited only to the illustrated modes.

Note that an image pickup apparatus according to the embodiment of the present invention described below is an image pickup apparatus including an image pickup device configured to execute an automatic focus adjustment process of an image pickup surface phase difference detection system, the image pickup apparatus configured to be capable of using the image pickup device to acquire image data (still image, movie), displaying the acquired image data on a display apparatus, and storing the image data in a storage medium.

Figure 1:
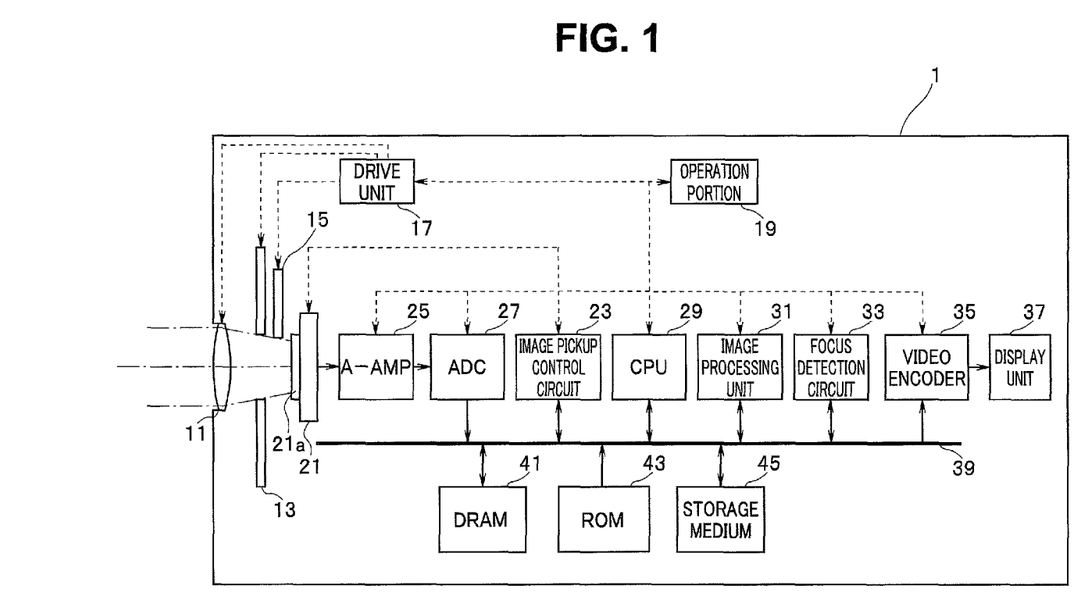
FIG. 1 is a block diagram schematically showing an overall configuration of an image pickup apparatus according to an embodiment of the present invention.
Figure 2:
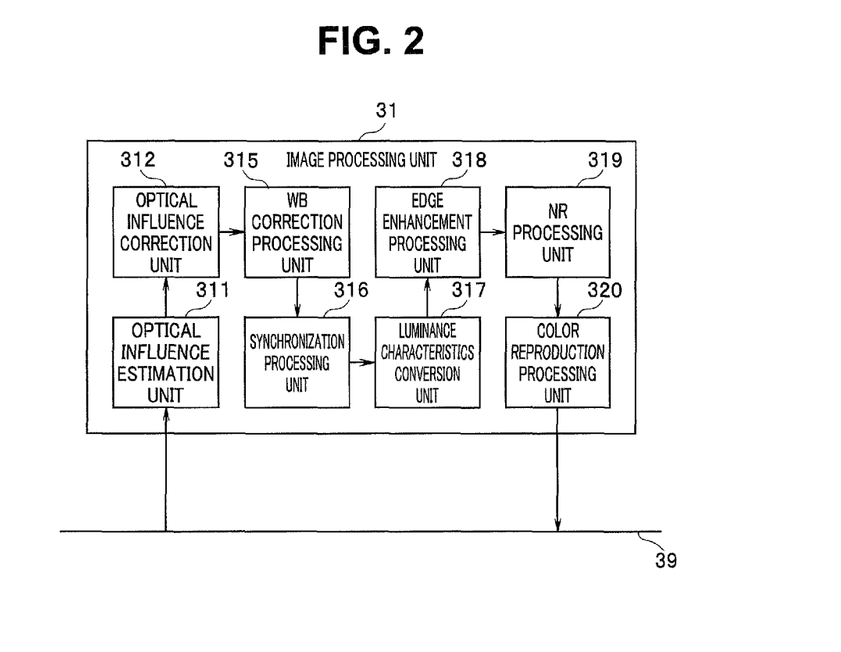
FIG. 2 is a block diagram showing a detailed configuration of an image processing unit in the image pickup apparatus of FIG. 1.
Figure 3:
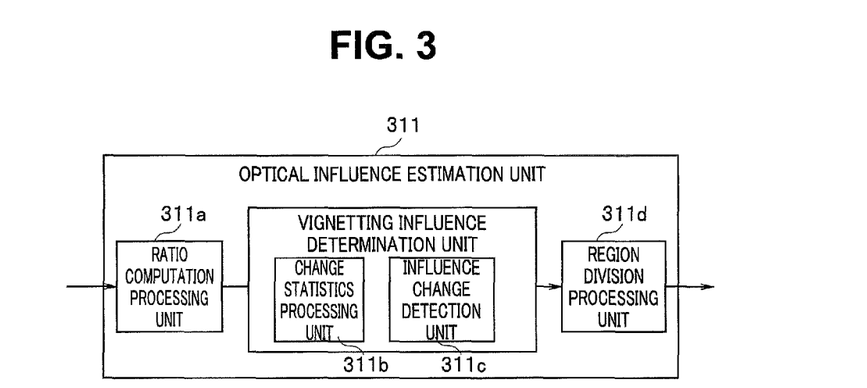
FIG. 3 is a block diagram showing a detailed configuration of an optical influence correction unit in the image processing unit of FIG. 2.
Figure 4:
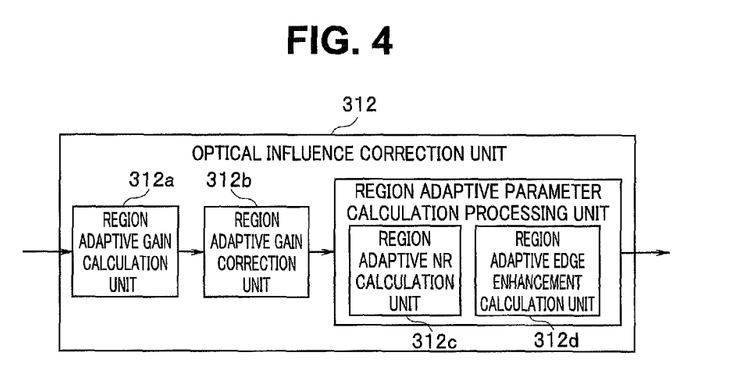
FIG. 4 is a block diagram showing a detailed configuration of an optical influence estimation unit in the image processing unit of FIG. 2.

FIG. 1 is a block diagram schematically showing an overall configuration of the image pickup apparatus according to an embodiment of the present invention. Note that solid lines with arrows in FIG. 1 show flows of data. Similarly, dotted lines with arrows in FIG. 1 show flows of control signals. FIG. 2 is a block diagram showing a detailed configuration of an image processing unit in the image pickup apparatus of FIG. 1. FIG. 3 is a block diagram showing a detailed configuration of an optical influence correction unit in the image processing unit of FIG. 2. FIG. 4 is a block diagram showing a detailed configuration of an optical influence estimation unit in the image processing unit of FIG. 2.

As shown in FIG. 1, an image pickup apparatus 1 of the present embodiment is mainly configured by: an image pickup lens 11; an aperture 13; a mechanical shutter 15; a drive unit 17; an operation portion 19; an image pickup unit 21 including an image pickup device 21a; an image pickup control circuit 23; an A-AMP 25; an analog-digital converter (ADC) 27; a control circuit unit (CPU, central processing unit) 29; an image processing unit 31; a focus detection circuit 33; a video encoder 35; a display unit 37; a bus 39; a temporary storage unit (DRAM, dynamic random access memory) 41; a ROM (read only memory) 43; a storage medium 45; and the like.

The image pickup lens 11 is an image pickup optical system configured to let light from an object to be imaged (so-called subject) transmit, thereby forming an image of the subject on an image pickup surface (image forming plane) of the image pickup device 21a. Here, the image pickup optical system is a configuration unit including: a single or a plurality of optical lenses; holding members configured to hold respective optical lenses; a drive mechanism and a driving source configured to move each of the holding members in a direction along an optical axis by a predetermined amount at a predetermined timing; and the like. The image pickup lens 11 can be either one of a fixed focal length lens and a zoom lens. Note that the image pickup lens 11 applied to the image pickup apparatus 1 of the present embodiment is a lens similar to a lens applied to a conventional image pickup apparatus with a general configuration, and the detailed configuration will not be described.

The aperture 13 is arranged on the optical axis of the image pickup lens 11. The aperture 13 is configured to have a variable diameter. The aperture 13 is a configuration unit including a mechanism for adjusting an amount of light of a luminous flux from the subject side transmitted through the image pickup lens 11. The configuration is similar to a configuration conventionally applied to a general image pickup apparatus.

The mechanical shutter 15 is arranged behind the aperture 13 on the optical axis of the image pickup lens 11 and is a configuration unit including a mechanism for allowing to open and close an optical path of the luminous flux passing through the aperture 13. The mechanical shutter 15 has a function of adjusting an opening time period of the mechanical shutter 15 to adjust an incident time period of the luminous flux from the subject to the image pickup surface (image forming plane) of the image pickup device 21a (that is, exposure time period of the image pickup device 21a). Examples of a specific mode of the mechanical shutter 15 include a well-known focal-plane shutter and a lens shutter.

The drive unit 17 is a configuration unit configured to perform focus adjustment drive of the image pickup lens 11, perform opening diameter control drive of the aperture 13, and perform opening/closing control drive of the mechanical shutter 15 based on control signals from the control circuit unit (hereinafter, referred to as CPU) 29.

The operation portion 19 is a general term of a section provided with constituent members including various operation members, such as a power button, a release button, a reproduction button, and a menu button, and various operation systems, such as a touch panel. The operation portion 19 also includes an electronic circuit configured to detect operation states of a plurality of various operation members to output signals indicating the detection results to the CPU 29. Here, the operation portion 19 in the image pickup apparatus 1 of the present embodiment also includes a mode selection operation member configured to select an image pickup operation mode of the image pickup apparatus 1.

That is, a user can operate an image pickup mode selection operation member, such as an operation dial, as an operation member included in the operation portion 19 to select one of a still image pickup mode and a movie pickup mode for an image pickup mode of the image pickup apparatus 1. Here, the still image pickup mode is an image pickup mode for picking up still images. The movie pickup mode is an image pickup mode for picking up images of a movie. Note that although the dial operation member is illustrated as an image pickup mode selection operation member in the example, the form is not limited to this, and for example, a touch panel may be operated on a menu screen to select the image pickup mode.

The image pickup unit 21 is a configuration unit including the image pickup device 21a. The image pickup unit 21 is arranged on the optical axis of the image pickup lens 11 and behind the mechanical shutter 15, wherein the image forming plane for forming an image of the subject luminous flux transmitted through the image pickup lens 11 and the image pickup surface of the image pickup device 21a are brought into line and parallel to each other. The image pickup unit 21 includes the image pickup device 21a and an electronic circuit substrate or the like provided with the image pickup device 21a. The image pickup unit 21 and the image pickup device 21a are driven and controlled by the image pickup control circuit 23.

The image pickup device 21a is an electronic component configured by two-dimensionally (in a matrix) arranging, in a horizontal direction and a vertical direction, photodiodes configuring pixels. The image pickup device 21a is a photoelectric conversion element configured to receive and photoelectrically convert the subject image formed by the image pickup lens 11.

Here, the image pickup device 21a applied to the image pickup apparatus 1 of the present embodiment includes: image pickup pixels for acquiring an image to be recorded or displayed, that is, image formation pixels (normal pixels) for forming an image; and functional pixels provided to realize a predetermined function. In this case, the functional pixels are arranged on some regions of effective pixel regions of the image pickup device 21a or arranged at a constant cycle in the effective pixel regions. Note that examples of the functional pixels include focus detection pixels (also referred to as phase difference detection pixels) for realizing a focus detection function based on a phase difference detection system. It is assumed that the image pickup device 21a in the present embodiment includes the focus detection pixels as functional pixels.

The focus detection pixels are pixels in a form provided with partially shielded OB regions (optical black regions, light-shielding regions). In the image pickup device 21a, the focus detection pixels are arranged on some of the regions on the image pickup surface effective in forming an image or arranged at a constant cycle in the image pickup pixels (normal pixels) on the image pickup surface.

The photodiodes configuring the image pickup device 21a are electronic components configured to generate charge according to amounts of received light. The charge generated by the photodiodes is accumulated in capacitors connected to the respective photodiodes. The charge accumulated in the capacitors is read as image signals. Here, the image pickup device 21a applied to the image pickup apparatus 1 of the present embodiment includes a plurality of different charge reading systems. The charge accumulated in the image pickup device 21a is read according to a control signal from the image pickup control circuit 23.

Front surfaces of the photodiodes configuring the respective pixels in the image pickup device 21a are provided with, for example, color filters in Bayer array. The Bayer array is in a general form including, in the horizontal direction, lines in which R pixels and G (Gr) pixels are alternately arranged and lines in which G (Gb) pixels and B pixels are alternately arranged.

The image pickup control circuit 23 is an electronic circuit configured to set a reading system of the image pickup device 21a according to a control signal from the CPU 29 and control reading of the image signals from the image pickup device 21a according to the set reading system. The reading system of pixel data from the image pickup device 21a is set according to an operation state of the image pickup apparatus 1. For example, when the pixel data from the image pickup device 21a needs to be read in real time (such as during display of a live view or during recording of a movie), a process of reading mixed pixel data from a plurality of pixels of the same color or a process of reading decimated pixel data of specific pixels is executed to allow reading the pixel data fast. On the other hand, when image quality is needed more than the real time property (such as during recording of a still image), the mixed reading or the decimation reading is not performed, and a process of reading the pixel data of all the pixels to maintain resolving power is executed.

The A-AMP 25 is an analog gain adjustment circuit configured to adjust analog gains of the image signals outputted from the image pickup device 21a.

The ADC 27 is an analog-digital converter. The ADC 27 is an electronic circuit configured to convert the image signals subjected to the analog gain adjustment by the A-AMP 25 into image signals (pixel data) in a digital format. Note that in the following description, a set of a plurality of pieces of pixel data acquired by the image pickup device 21a will be referred to as image pickup data.

The CPU 29 is an electronic circuit configured to control the entire image pickup apparatus 1 according to a program stored in the ROM 43.

The image processing unit 31 is an electronic circuit configured to apply various types of image processing to the image pickup data to generate image data. During recording of a still image for example, the image processing unit 31 applies image processing for still image recording to generate still image data. Similarly, during recording of a movie, the image processing unit 31 applies image processing for movie recording to generate movie data. Furthermore, during display of a live view, the image processing unit 31 executes image processing for display to generate image data for display. A detailed configuration of the image processing unit 31 will be further described later.

The focus detection circuit 33 is an electronic circuit configured to acquire the pixel data from the focus detection pixels (phase difference detection pixels) of the image pickup device 21*a* and use a well-known phase difference detection process based on the acquired pixel data to calculate a defocus direction and an amount of defocus with respect to a focus position of the image pickup lens 11. Here, the defocus denotes a deviation of the image forming plane of the image pickup lens 11 in the optical axis direction.

The video encoder 35 is an electronic circuit configured to read the image data for display generated by the image processing unit 31 and temporarily stored in the temporary storage unit (hereinafter, referred to as DRAM) 41 and output the read image data for display to the display unit 37.

The display unit 37 is a configuration unit including a display apparatus, such as a liquid crystal display and an organic EL display, and is arranged on, for example, a back surface of the image pickup apparatus 1. The display unit 37 is a configuration unit including an electronic circuit configured to receive the image data for display outputted from the video encoder 35 and display a corresponding image on a display screen. The display unit 37 is used for displaying a live view, displaying a recorded image, and the like.

The bus 39 is connected to the ADC 27, the image pickup control circuit 23, the CPU 29, the image processing unit 31, the focus detection circuit 33, the video encoder 35, the DRAM 41, the ROM 43, the storage medium 45, and the like and is a data transmission path in which various types of data generated by the respective blocks are transferred.

The DRAM 41 is an electrically rewritable memory and is a temporary storage unit configured to temporarily store the image pickup data (pixel data), the image data for recording, and the image data for display, as well as various types of data, such as processing data in the CPU 29. Note that an SDRAM (synchronous dynamic random access memory) and the like can also be used as a temporary storage memory.

The ROM 43 is a non-volatile memory, such as a mask ROM and a flash memory. The ROM 43 is a storage unit configured to store in advance a program used by the CPU 29, specific information in the image pickup apparatus 1, and various types of data such as an adjustment value.

The storage medium 45 can be built in or loaded on the image pickup apparatus 1 and is a configuration unit including a storage circuit configured to store the image data for recording as an image file in a predetermined format.

Next, the detailed configuration of the image processing unit 31 will be described, mainly with reference to FIGS. 2 to 4. As shown in FIG. 2, the image processing unit 31 includes an optical influence estimation unit 311, an optical influence correction unit 312, a white balance (WB) correction processing unit 315, a synchronization processing unit 316, a luminance characteristics conversion unit 317, an edge enhancement processing unit 318, a noise reduction (NR) processing unit 319, and a color reproduction processing unit 320.

Note that various configuration sections configuring the image processing unit 31 are not limited to the configuration sections described above, and other configuration sections are also included. An example of the other configuration sections in the image processing unit 31 includes a compression and decompression processing unit. However, since the configuration sections other than the configuration sections described above are parts not directly related to the present invention, the configuration sections will not be illustrated, and the configuration sections will not be described.

The optical influence estimation unit 311 is a circuit unit configured to calculate statistical data based on the image data acquired by the image pickup device 21*a* and configured to use the calculated statistical data to detect whether there is an influence of vignetting and an image height position where the influence is prominent if there is an influence. That is, the optical influence estimation unit 311 is a circuit unit configured to use output signals from the image formation pixels, output signals from the focus detection pixels, and two-dimensional pixel position information of the focus detection pixels to estimate a level of influence of vignetting caused by the image pickup optical system according to the image height. Note that details of the optical influence estimation unit 311 will be described later (see FIG. 3).

The optical influence correction unit 312 is a circuit unit configured to execute local image processing according to the position of the influence of vignetting obtained by the optical influence estimation unit 311. Note that details of the optical influence correction unit 312 will be described later (see FIG. 4).

The white balance correction processing unit (hereinafter, referred to as WB correction processing unit) 315 is a circuit unit configured to use a predetermined amount of gain to amplify each color component of the image pickup data to correct color balance of the image.

The synchronization processing unit 316 is a circuit unit configured to, for example, convert image pickup data, in which one pixel corresponds to one color component, into image data, in which one pixel corresponds to a plurality of color components, in the image pickup data outputted through the image pickup device 21*a* according to the Bayer array of the color filters of the image pickup device 21*a*.

The luminance characteristics conversion unit 317 is a circuit unit configured to convert luminance characteristics of the image data generated by the synchronization processing unit 316 to make the luminance characteristics suitable for display or recording.

The edge enhancement processing unit 318 is a configuration unit configured to multiply an edge signal, which is extracted from the output data (image data) from the luminance characteristics conversion unit 317 by using a bandpass filter or the like, by an edge enhancement coefficient and add the result to the original image data to thereby enhance edge (contour) components in the target image data.

The noise reduction processing unit (hereinafter, referred to as NR processing unit) 319 is a circuit unit configured to use a coring process or the like to remove noise components in the output data (image data) from the edge enhancement processing unit 318.

The color reproduction processing unit 320 is a circuit unit configured to execute various processes for appropriate color reproduction of the image. An example of the processes executed here includes a color matrix computation process. The color matrix computation process is, for example, a process of multiplying the image data by a color matrix coefficient according to a white balance mode. In addition, the color reproduction processing unit 320 executes, for example, a correction process of saturation and hue.

Here, the optical influence estimation unit 311 and the optical influence correction unit 312 will be described in more detail with reference to FIGS. 3 and 4.

First, as shown in FIG. 3, the optical influence estimation unit 311 includes: a ratio computation processing unit 311a; a vignetting influence determination unit including a change statistics processing unit 311b and an influence change detection unit 311c; and a region division processing unit 311d.

The ratio computation processing unit 311a is a circuit unit configured to calculate a ratio of the focus detection pixels (phase difference detection pixels) and the image pickup pixels (normal pixels) at each image height position. Here, a ratio value is, for example, as follows, wherein n denotes a normal pixel output value, and m denotes a phase difference pixel output value of a left opening.

Ratio value=$m/n$

The change statistics processing unit 311b of a later stage uses the ratio value calculated by the ratio computation processing unit 311a as statistical data for estimating the image height position where there is an influence of vignetting. Note that the ratio value of the image height position may be calculated as statistical data in any one of the horizontal direction, the vertical direction, and an oblique direction according to conditions such as an opening direction of the focus detection pixels. The data of the ratio value calculated by the ratio computation processing unit 311a is outputted to the change statistics processing unit 311b of the vignetting influence determination unit of the later stage (see FIG. 3).

The change statistics processing unit 311b is a circuit unit configured to use the statistical data (data of ratio value at each image height position) calculated by the ratio computation processing unit 311a to statistically analyze a change tendency according to the image height to calculate a tendency in the change in the ratio value associated with the change in the image height.

The change statistics processing unit 311b calculates, for example, a first derivation between adjacent horizontal pixels (difference between ratio values) regarding the ratio values calculated by the ratio computation processing unit 311a. The first derivation values calculated by the change statistics processing unit 311b and the horizontal pixel position data are classified into statistically similar groups. Here, well-known means, such as k-means clustering, is used for the classification.

The influence change detection unit 311c is a circuit unit configured to detect an inflection point from the change in the ratio value associated with the change in the image height calculated by the change statistics processing unit 311b.

The influence change detection unit 311c observes regions (for example, groups A, B, . . . ) classified by the change statistics processing unit 311b to determine the level of influence of vignetting. For example, the influence change detection unit 311c obtains a difference value between an average value of a y axis in the group A (ratio value=$m/n$) and an average value of the y axis in the group B (ratio value=$m/n$) and determines that the influence of vignetting is large when the difference value is large.

The region division processing unit 311d is a circuit unit configured to use the data of the inflection point detected by the influence change detection unit 311c to determine the image height position where there is an influence of vignetting.

The region division processing unit 311d divides regions with different influences of vignetting based on the image height position data of each region classified by the change statistics processing unit 311b. For example, the region division processing unit 311d divides the regions by setting a boundary at the horizontal pixel position of the data at the furthest edge in the statistical data belonging to the group A. Alternatively, the region division processing unit 311d may divide the regions by setting a boundary based on an average value of an x axis in the group A (horizontal pixel position) and a range of standard deviation of the average value.

Next, as shown in FIG. 4, the optical influence correction unit 312 includes: a region adaptive gain calculation unit 312a; a region adaptive gain correction unit 312b; and a region adaptive parameter calculation processing unit including a region adaptive noise reduction (NR) calculation unit 312c and a region adaptive edge enhancement calculation unit 312d.

The region adaptive gain calculation unit 312a is a circuit unit configured to use the data obtained by the optical influence estimation unit 311 (region division processing unit 311d of optical influence estimation unit 311), that is, the data of the image height position where there is an influence of vignetting, to calculate a formula indicating a tendency in an amount of light falloff of each region in order to calculate an amount of gain of the gain to be corrected in each region classified by the optical influence estimation unit 311. The calculation formula is obtained by a method of calculating an approximation formula by using well-known means, such as a least squares method. That is, a primary expression "$y=a1x+b1$" is calculated for each region. In this case, b1 is changed according to the correction target.

Focus detection pixel for image formation:
$y=a1x+b1$ (b1 is derived from opening; phase difference pixel correction)
Focus detection pixel for focus detection:
$y=a1x+1.0$ (shading correction in phase difference AF)
Normal pixel for image formation:
$y=a1x+1.0$ (shading correction in image formation)

The region adaptive gain correction unit 312b is a circuit unit configured to correct the gain according to the amount of gain (approximation formula) of each region obtained by the region adaptive gain calculation unit 312a. The value y calculated by the region adaptive gain calculation unit 312a is an amount of light falloff. Therefore, a reciprocal can be multiplied for the gain correction. For example, when y=0.8, the amount of gain=1.0/0.8=1.25.

The region adaptive NR calculation unit 312c is a circuit unit configured to use the data of the image height position where there is an influence of vignetting obtained by the optical influence estimation unit 311 to determine a noise reduction process to be applied to each region. For example, when a large gain is applied in the previous stage, the region adaptive NR calculation unit 312c executes a process of increasing the effect of the noise reduction or the like.

The region adaptive edge enhancement calculation unit 312d is a circuit unit configured to use the data of the image height position where there is an influence of vignetting obtained by the optical influence estimation unit 311 to determine an edge enhancement process to be applied to each region. For example, when a large gain is applied in the previous stage, and the noise reduction is increased, the region adaptive edge enhancement calculation unit 312d also executes a process of increasing the edge enhancement or the like.

That is, the region adaptive parameter calculation processing unit (region adaptive NR calculation unit 312c, region adaptive edge enhancement calculation unit 312d) changes the details of the image processing according to the amount of gain (that is, degree and level of influence of vignetting) in the gain correction by the region adaptive gain correction unit 312b.

Specifically, when, for example, the amount of gain is large, the region adaptive parameter calculation processing unit executes a process, such as increasing the noise reduction (NR) strength and reducing the noise to increase the degree of edge enhancement.

Note that the region adaptive parameter calculation processing unit may determine the noise reduction (NR) strength and the degree of edge enhancement for each certain threshold according to the amount of gain, for example. A calculation formula according to the amount of gain may also be used.

Figure 5:
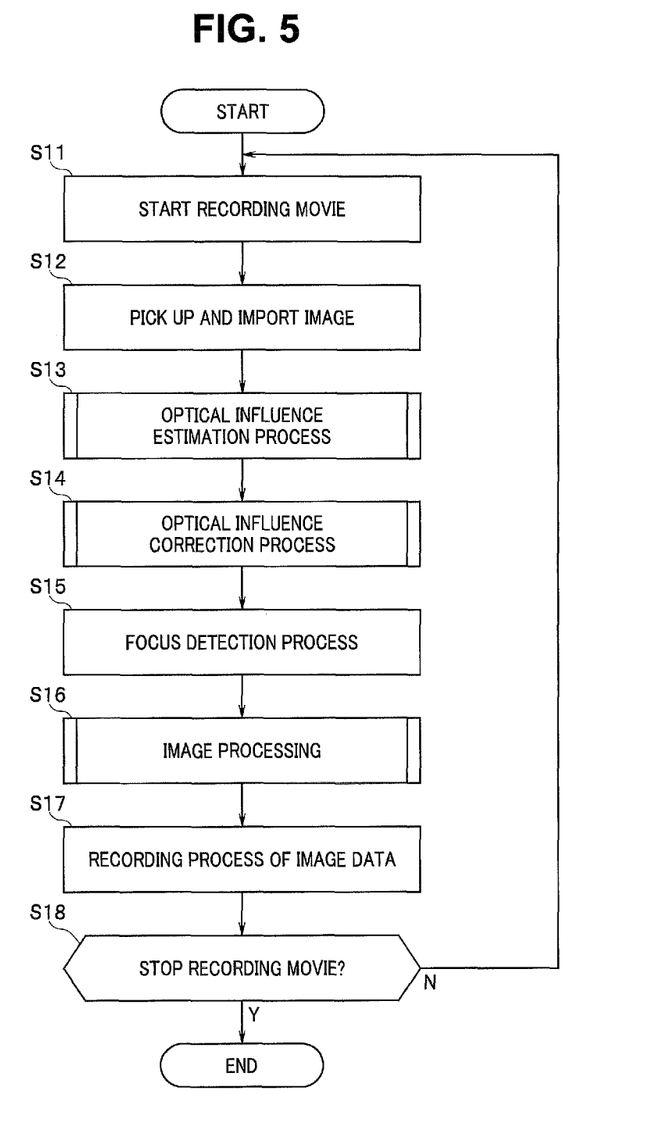
FIG. 5 is a main flowchart in the image pickup apparatus of FIG. 1.

An action in the image pickup apparatus 1 of the present embodiment configured in this way will be described with reference to FIG. 5. FIG. 5 is a main flowchart in the image pickup apparatus of FIG. 1.

First, it is assumed that the image pickup apparatus 1 of the present embodiment is in a started state and is in a standby state of a recording operation after a movie recording mode for recording a movie is set. It is assumed that the release button included in the operation portion 19 is operated at an arbitrary timing, and a predetermined release signal is generated.

Consequently, in step S11 of FIG. 5, the CPU 29 receives an instruction signal from the operation portion 19 and controls the drive of the image pickup lens 11, the aperture 13, the mechanical shutter 15, and the like through the drive unit 17. The CPU 29 also controls the image pickup unit 21 through the image pickup control circuit 23 and starts to control the movie recording operation.

Subsequently, in step S12, the CPU 29 controls reading of an image signal from the image pickup device 21a through the image pickup control circuit 23. As described, the read image signal is subjected to the analog gain adjustment by the A-AMP 25 and the analog-digital conversion process by the ADC 27, and the image signal is temporarily stored in the DRAM 41.

Next, in step S13, the CPU 29 controls the image processing unit 31 to execute an optical influence estimation process. Here, the optical influence estimation process is the signal processing executed by the optical influence estimation unit 311 in the image processing unit 31.

That is, the CPU 29 inputs the image data, which is acquired by the image pickup unit 21, subjected to the predetermined processing, and temporarily stored in the DRAM 41, to the image processing unit 31 through the bus 39.

The image data inputted to the image processing unit 31 is inputted to the optical influence estimation unit 311 as described above. In this case, the image data is first inputted to the ratio computation processing unit 311a, and the ratio computation processing unit 311a calculates the ratio of the focus detection pixels (phase difference detection pixels) and the image pickup pixels (normal pixels) at each image height position. The calculation result (ratio value data, statistical data) is outputted to the change statistics processing unit 311b.

In response, the change statistics processing unit 311b uses the inputted statistical data (data of ratio value at each image height position) to statistically analyze the change tendency according to the image height and calculates the tendency in the change in the ratio value associated with the change in the image height. The calculation result (ratio value change data associated with the change in the image height) is outputted to the influence change detection unit 311c.

In response, the influence change detection unit 311c detects the inflection point from the inputted data (data of the change in the ratio value associated with the change in the image height). The calculation result (inflection point data) is outputted to the region division processing unit 311d.

In response, the region division processing unit 311d uses the inputted data (inflection point data) to determine the image height position where there is an influence of vignetting. The determined image height position data is outputted to the optical influence correction unit 312, and the process proceeds to step S14 of FIG. 5.

Next, in step S14, the CPU 29 controls the image processing unit 31 to execute an optical influence correction process. Here, the optical influence correction process is signal processing executed by the optical influence correction unit 312 in the image processing unit 31.

As described, the data acquired by the region division processing unit 311d of the optical influence estimation unit 311 (image height position data where there is an influence of vignetting) is inputted to the optical influence correction unit 312. In response, the region adaptive gain calculation unit 312a of the optical influence correction unit 312 calculates the amount of gain of the gain to be corrected, for each region classified by the optical influence estimation unit 311. The calculation result is outputted to the region adaptive gain correction unit 312b.

In response, the region adaptive gain correction unit 312b executes a gain correction process according to the inputted data (amount of gain (approximation formula) of each region). The processing result is outputted to the region adaptive parameter calculation processing unit (312c, 312d).

In response, the region adaptive NR calculation unit 312c uses the inputted data (image height position data where there is an influence of vignetting) to determine a noise reduction process to be applied to each region.

Similarly, the region adaptive edge enhancement calculation unit 312d uses the inputted data (image height position data where there is an influence of vignetting) to determine an edge enhancement process to be applied to each region.

In this way, the image data subjected to the NR process and the edge enhancement process by the region adaptive parameter calculation processing unit (312c, 312d) is temporarily outputted to the DRAM 41 and temporarily stored in the DRAM 41. The process then proceeds to step S15.

Next, in step S15, the CPU 29 controls the focus detection circuit 33 to execute a focus detection process. The focus detection process is executed by using the image data subjected to the optical influence correction process temporarily stored in the DRAM 41. That is, the image data of the focus detection pixels (phase difference detection pixels) in the image data is acquired, and the defocus direction and the amount of defocus with respect to the focus position of the image pickup lens 11 are calculated based on the acquired pixel data. Note that the focus detection process is a well-known image pickup surface phase difference detection process. The process then proceeds to step S16.

Subsequently, in step S16, the CPU 29 controls the image processing unit 31 to execute predetermined image processing. Examples of the image processing executed here include the white balance correction process by the WB correction processing unit 315, the synchronization processing by the synchronization processing unit 316, the luminance characteristics conversion process by the luminance characteristics conversion unit 317, the edge enhancement process by the edge enhancement processing unit 318, the noise reduction process by the NR processing unit 319, and the color reproduction process by the color reproduction processing unit 320. After the execution of the image processing, the generated image data is outputted to the DRAM 41 and temporarily stored in the DRAM 41. The process then proceeds to step S17.

In step S17, the CPU 29 controls the image processing unit 31 to generate image data for recording and executes a recording process of storing the image data for recording in the storage medium 45.

Subsequently, in step S18, the CPU 29 monitors the instruction signal from the operation portion 19 and confirms whether there is a stop instruction for recording the movie. Here, if the CPU 29 confirms that there is a stop instruction for recording the movie from the operation portion 19, the CPU 29 ends the series of processes. If the CPU 29 dose not confirm stop instruction for recording the movie from the operation portion 19, the CPU 29 returns to the process of step S11 and repeats the subsequent processes.

As described, according to the image pickup apparatus 1 of the embodiment, some of the pixels in the region provided with the image formation pixels arranged in a matrix are arranged as focus detection pixels, and the image pickup apparatus includes the image pickup device configured to photoelectrically convert the subject image formed by the image pickup optical system. Based on the ratio computation result of the output signals from the image formation pixels (normal pixels) and the output signals from the focus detection pixels (phase difference detection pixels) and the two-dimensional pixel position information of the focus detection pixels, the optical influence estimation unit 311 estimates the level (degree) of influence of vignetting caused by the image pickup optical system according to the image height. The optical influence correction unit 312 executes appropriate image processing with different details that vary according to the estimation result of the optical influence estimation unit 311, that is, local image processing according to the influence of vignetting that varies depending on the image height (pixel position).

According to the configuration, deterioration of the image quality caused by the focus detection pixels can be prevented, and image data representing an image as a favorable high-quality image pickup result can be always acquired independently of the image pickup optical system used in the image pickup operation.

Particularly, even if there are manufacturing variations in the image pickup optical system or even if optical information cannot be acquired from the image pickup optical system because an electrical contact is not provided, the level (degree) of influence of vignetting caused by the image pickup optical system can be estimated, and an appropriate optical influence correction process can be always executed.

Note that although the signal processing method performed by the program executed by the CPU 29 of the image pickup apparatus 1 is illustrated in the embodiment, the form is not limited to this. For example, the method can also be implemented as a program executable by a general computer. The image data handled in this case is, for example, image data picked up by a general image pickup apparatus and recorded in a recording medium corresponding to a computer or the like storing the program.

Figure 6:
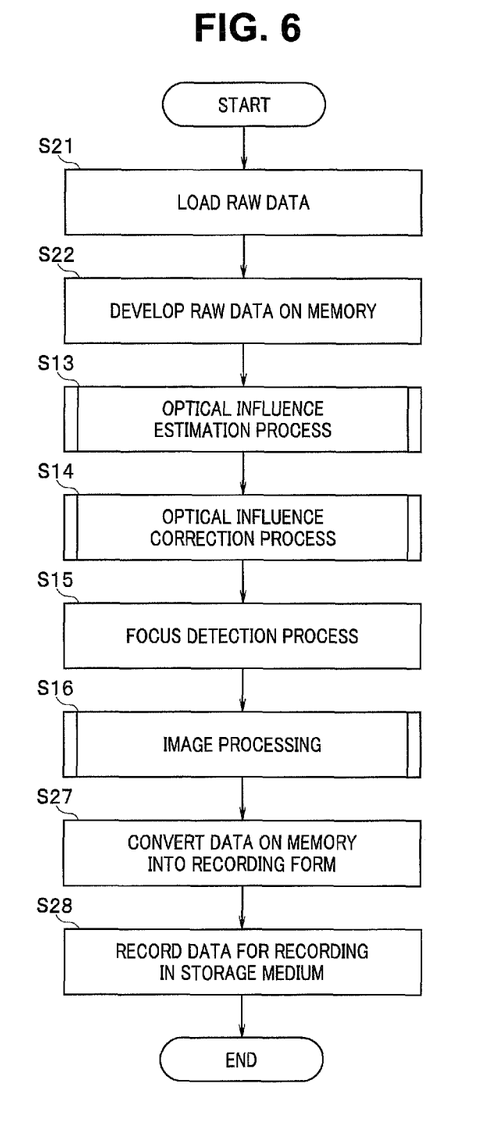
FIG. 6 is a flowchart showing an example in which a computer executes a signal processing method according to the embodiment of the present invention.

FIG. 6 is a flowchart showing an example in which the computer executes the signal processing method according to the embodiment of the present invention.

First, it is assumed that the computer not shown has executed the program describing the signal processing method of the embodiment.

Consequently, in step S21 of FIG. 6, a control unit of the computer loads RAW (unprocessed) data corresponding to desirable image data from a storage medium (not shown) recording the photographed image data.

Subsequently, in step S22, the control unit of the computer develops the RAW data loaded in the process of step S21, on a work memory (not shown) in the computer. The process then proceeds to step S13.

Each process of step S13 (optical influence estimation process), step S14 (optical influence correction process), step S15 (focus detection process), and step S16 (image processing) is executed. Each process of steps S13 to S16 is exactly the same as the process in the embodiment (see FIG. 5). Therefore, the details will not be described.

Subsequently, in step S27, the control unit of the computer executes a process of converting the image data developed on the work memory into image data for recording.

Next, in step S28, the control unit of the computer executes a process of recording, in the storage medium, the image data for recording generated in the process of step S27. Then, the series of processes end.

The procedure of each processing sequence described in each embodiment can be changed unless it is inconsistent with the nature of the processing sequence. Therefore, in the processing sequence, the order of executing each processing step can be changed, or a plurality of processing steps can be executed at the same time, for example. The order of each processing step may vary every time the series of processing sequences are executed. That is, even if "First", "Next", and the like are used for the convenience of description regarding the operation flows in the claims, the specification, and the drawings, this does not mean that the implementation in this order is essential. It is obvious that part of each step configuring the operation flows that does not affect the essence of the invention can be appropriately omitted.

Among the techniques described here, many of the control and the functions mainly described in the flowcharts can often be set by software programs, and a computer can read and execute the software programs to realize the control and the functions. The software programs are electronic data entirely or partially stored or recorded in advance as a computer program product in the storage medium, the storage unit, or the like in a product manufacturing process, specifically, in a portable medium, such as a non-volatile memory like a flexible disk or a CD-ROM, or in a storage medium, such as a hard disk and a volatile memory. Other than these, the software programs can be distributed or provided at the product shipment or through a portable medium or a communication line. Even after the product shipment, the user can download the software programs through a communication network, the Internet, or the like to install the software programs on the computer or can install the software programs on the computer from a storage medium to allow the operation. In this way, the image pickup apparatus of the present embodiment can be easily realized.

Note that the present invention is not limited to the embodiment, and it is obvious that various modifications and applications can be carried out without departing from the scope of the invention. Furthermore, the embodiment includes inventions of various phases, and various inventions can be extracted based on appropriate combinations of a plurality of disclosed constituent conditions. For example, when the problem to be solved by the invention can be solved, and the advantageous effects can be obtained even if some of the constituent conditions illustrated in the embodiment are deleted, the configuration after the deletion of the constituent conditions can be extracted as an invention. Furthermore, constituent elements across different embodiments may also be appropriately combined. Other than being limited by the attached claims, the invention is not restricted by a specific embodiment of the invention.

The present invention is not limited to the image pickup device that is an electronic device specialized for the image pickup function, such as a digital camera, and the present invention can be widely applied to electronic devices in other forms having the image pickup function and various electronic devices having a sound recording and reproduction function, such as a mobile phone, a smartphone, an electronic notebook, an electronic dictionary, a mobile information terminal, a personal computer, a tablet terminal device, a gaming device, a television, a watch, and a navigation device using GPS (global positioning system).

Furthermore, the present invention can be similarly applied to electronic devices having a function of using an image pickup device to acquire an image and displaying the acquired image on a display apparatus, such as a telescope, binoculars, a microscope, and other observation devices.

What is claimed is:

1. An image pickup apparatus comprising:
    an image pickup optical system configured to form a subject image;
    an image pickup device configured to photoelectrically convert the subject image formed by the image pickup optical system, wherein part of pixels in a region provided with image formation pixels arranged in a matrix are arranged as focus detection pixels;
    an optical influence estimation circuit configured to use output signals from the image formation pixels, output signals from the focus detection pixels, and two-dimensional pixel position information of the focus detection pixels to estimate a level of influence of vignetting caused by the image optical system according to an image height; and
    an optical influence correction circuit configured to execute image processing with different details that vary according to an estimation result of the optical influence estimation circuit,
    wherein the optical influence estimation circuit further comprises:
        a ratio computation processing circuit configured to calculate a ratio of the output signals from the image formation pixels and the output signals from the focus detection pixels according to the image height;
        a vignetting influence determination circuit configured to judge a magnitude of influence of vignetting from a change in the ratio according to the image height calculated by the ratio computation processing circuit; and
        a region division processing circuit configured to divide an inside of an image pickup region into a plurality of regions according to the level of influence of vignetting caused by the image pickup optical system according to the image height,
    wherein the vignetting influence determination circuit further comprises:
        a change statistics processing circuit configured to statistically determine whether the change in the ratio according to the image height calculated by the ratio computation processing circuit is a close change; and
        an influence change detection circuit configured to determined that the influence of vignetting is changed at an image height position where a tendency of the change is different,
    wherein the optical influence correction circuit executes the image processing with different details that vary in each of the regions divided by the region division processing circuit.

2. The image pickup apparatus according to claim 1, wherein
    the region division processing circuit of the optical influence estimation circuit divides the inside of the image pickup region, as a region with a different influence of vignetting, the image height position with the different tendency of the change outputted by the influence change detection circuit.

3. The image pickup apparatus according to claim 1, wherein
    the optical influence correction circuit further comprises:
        a region adaptive gain calculation circuit configured to calculate each amount of gain to be applied to the image formation pixels and the focus detection pixels according to an output of the optical influence estimation circuit, for each image height position of the influence of vignetting at a similar level; and
        a region adaptive gain correction circuit configured to execute a gain correction process according to the amount of gain of each image height position calculated by the region adaptive gain calculation circuit.

4. The image pickup apparatus according to claim 1, wherein
    the optical influence correction circuit further comprises a region adaptive parameter calculation processing circuit configured to calculate each image processing parameter to be applied to both the image formation pixels and the focus detection pixels according to the output of the optical influence estimation circuit, for each image height position of the influence of vignetting at the similar level.

5. The image pickup apparatus according to claim 4, wherein
    the region adaptive parameter calculation processing circuit comprises:
        a region adaptive noise reduction calculation circuit configured to calculate a parameter of an edge enhancement process according to the image height position; and
        a region adaptive edge enhancement calculation circuit configured to calculate a parameter of an edge enhancement process according to the image height position.

6. A signal processing method of processing an output signal from an image pickup device configured to photoelectrically convert a subject image formed by an image pickup optical system, wherein part of pixels in a region provided with image formation pixels arranged in a matrix and arranged as focus detection pixels in the image pickup device, the signal processing method comprising:

an optical influence estimation process of using output signals from the image formation pixels, output signals from the focus detection pixels, and two-dimensional pixel position information of the focus detection pixels to estimate a degree of influence of vignetting caused by the image optical system according to an image height; and an optical influence correction process of executing image processing with different details that vary according to the degree of influence of vignetting estimated in the optical influence estimation process, wherein the optical influence estimation process further comprises:

a ratio computation process of calculating a ratio of the output signals from the image formation pixels and the output signals from the focus detection pixels according to the image height;

a vignetting influence determination process of judging a magnitude of influence of vignetting from a change in the ratio according to the image height calculated by the ratio computation process; and a region division process of dividing an inside of an image pickup region into a plurality of regions according to the level of influence of vignetting caused by the image pickup optical system according to the image height, wherein the vignetting influence determination process further comprises:

a change statistics process of statistically determining whether the change in the ratio according to the image height calculated by the ratio computation process is a close change; and an influence change detection process of determining that the influence of vignetting is changed at an image height position where a tendency of the change is different, wherein the optical influence correction process executes the image processing with different details that vary in each of the regions divided by the region division process.

7. A non-transitory computer-readable medium storing a signal processing program for a computer of an image pickup apparatus, the signal processing program comprising:

an optical influence estimation step of estimating a degree of influence of vignetting caused by an image optical system according to an image height by using output signals from image formation pixels, output signals from focus detection pixels, and two-dimensional pixel position information of the focus detection pixels; and an optical influence correction step of executing image processing with different details that vary according to the degree of influence of vignetting estimated in the estimating, wherein the optical influence estimation step further comprises:

a ratio computation step of calculating a ratio of the output signals from the image formation pixels and the output signals from the focus detection pixels according to the image height;

a vignetting influence determination step of judging a magnitude of influence of vignetting from a change in the ratio according to the image height calculated by the ratio computation step; and a region division step of dividing an inside of an image pickup region into a plurality of regions according to the level of influence of vignetting caused by the image pickup optical system according to the image height, wherein the vignetting influence determination step further comprises:

a change statistics step of statistically determining whether the change in the ratio according to the image height calculated by the ratio computation step is a close change; and an influence change detection step of determining that the influence of vignetting is changed at an image height position where a tendency of the change is different, wherein the optical influence correction step executes the image processing with different details that vary in each of the regions divided by the region division step.

* * * * *